United States Patent [19]

McCabe et al.

[11] 3,860,765

[45] Jan. 14, 1975

[54] TELEPHONE NUMBER GENERATOR

[75] Inventors: Edward J. McCabe; Donald E. Westphal, both of Wellsboro, Pa.

[73] Assignee: Mek-Tronix Laboratories Corporation, Mansfield, Pa.

[22] Filed: Nov. 16, 1973

[21] Appl. No.: 416,660

[52] U.S. Cl. .................................................. 179/90 B
[51] Int. Cl. .............................................. H04m 1/51
[58] Field of Search ............. 179/90 B, 90 BB, 90 R

[56] References Cited

UNITED STATES PATENTS

| | | | |
|---|---|---|---|
| 3,536,853 | 10/1970 | Tate | 179/90 B |
| 3,735,050 | 5/1973 | Mardas | 179/90 B |

*Primary Examiner*—Kathleen Claffy
*Assistant Examiner*—Gerald L. Brigance
*Attorney, Agent, or Firm*—Anthony A. O'Brien

[57] ABSTRACT

A repertory telephone dialer utilizes a single keyboard with push-button switches which, when first operated while the telephone dialer is in a program mode, select a memory location for storing a telephone number generated by subsequent operation of the push-button switches. When the telephone dialer is in a call mode, the first operation of the push-button switches results in the application of dialing signals to a telephone line in accordance with representations stored at the selected memory location.

10 Claims, 12 Drawing Figures

| DIGIT | ADD. | DIGIT | ADD. |
|---|---|---|---|
| 1 | 1 | 6 | 221 |
| 2 | 45 | 7 | 265 |
| 3 | 89 | 8 | 309 |
| 4 | 133 | 9 | 333 |
| 5 | 177 | 0 | 397 |

TELEPHONE NUMBER GENERATOR

BACKGROUND OF THE INVENTION

1. Field of the Invention

The invention relates to a telephone number generator, and in particular, to apparatus for generating a multiple digit telephone number, such as an eleven digit telephone number, in response to the selection of a significantly lesser number of digits, such as a single digit.

2. Description of the Prior Art

The prior art, as exemplified in U.S. Pat. Nos. 3,555,201, 3,665,113, 3,670,111, and 3,735,050, includes many repertory dialers which apply telephone dialing signals to a telephone line in response to the selection of a switch corresponding to the telephone number of the desired party. The prior art repertory dialers which utilize electronically programmable memories require separate switching keyboards to select the particular location of the stored number in a memory and for generating signals to be stored within selected locations in the memory. Such duplication of keyboards unnecessarily increases the cost and complexity as well as the size of the telephone instrument.

SUMMARY OF THE INVENTION

The invention is summarized in that an apparatus for generating signals corresponding to digits of a selected telephone number on a telephone line includes a single push button keyboard including ten push button switches, switch means for selecting a record mode or a call mode, memory means for receiving and storing representations of a plurality of telephone numbers in selected locations of the memory means, each of the plurality of the telephone numbers having a plurality of digits, means responsive to a first operation of the push button switches when the switch means is in the record mode or the call mode for selecting a location in the memory means, means responsive to subsequent operation of the push button switches in accordance with the selected telephone number when the switch means is in the record mode for storing representations of the selected telephone number in the selected location in the memory means, means responsive to the receipt of a representation of a digit for producing signals on the telephone line corresponding to the received representation of the digit, and means responsive to the memory location selecting means when the switch means is in the call mode for applying representations of digits from the selected location to the signal producing means.

An object of the invention is to eliminate duplication of keyboards in repertory telephone number generators.

Another object of the invention is to utilize the conventional telephone keyboard of ten push button switches to both select a memory location and to generate representations of selected numbers to store in the selected memory location.

It is also an object of the invention to eliminate erroneous operation of circuitry in a repertory dailer due to irregularities in switch operation such as contact bounce and the like.

Additional features of the invention include the provision of a pair of random access memories, one for storing several telephone numbers to be selectively recalled, and the other for temporarily storing a number as it is generated on the telephone line; the provision of a counter circuit for controlling the size of a memory location for storing a telephone number; and the provision of facilities responsive of the operation of a hook switch for clearing repertory circuit function.

DESCRIPTION OF THE PREFERRED EMBODIMENT

Figures 1, 2, 3:
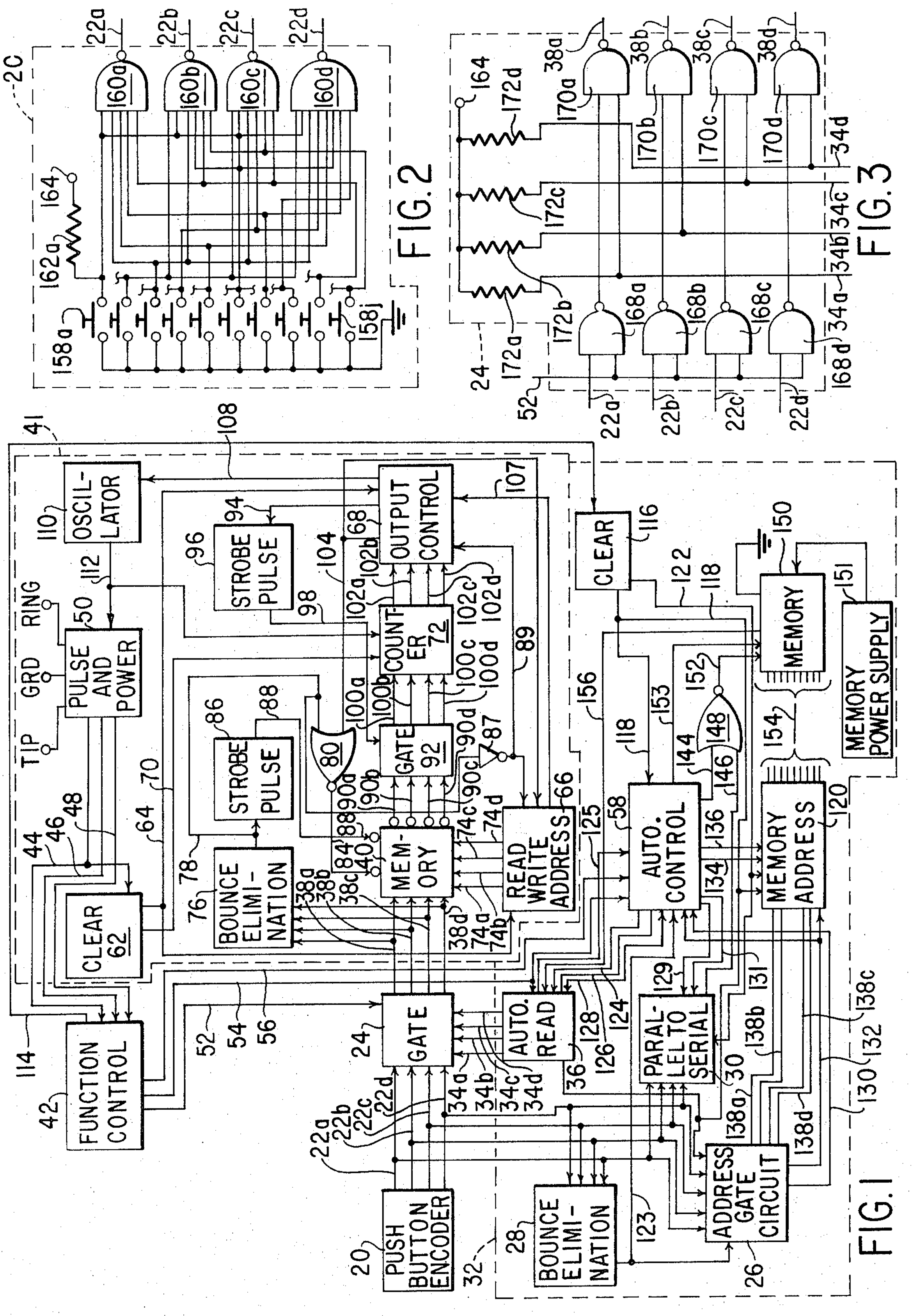
FIG. 1 is a block diagram of a circuit in accordance with the invention.
FIG. 2 is a detail diagram of a keyboard and encoding circuit of the circuitry in FIG. 1.
FIG. 3 is a detail diagram of a gate circuit of the circuitry shown in FIG. 1.

As illustrated in FIG. 1, the invention is embodied in a telephone number generator including a single push representations encoder circuit 20 for generating binary signals or representations on lines 22*a*, 22*b*, 22*c*, and 22d connected to a gate circuit 24, an address gate circuit 26, a bounce elimination circuit 28, and a parallel-to-serial converter circuit 30; the latter three 26, 28 and 30 included in a telephone number repertory circuit 32, identified by the enclosed dashed line. Lines 34*a*, 34*b*, 34*c*, and 34d connect outputs of an automatic read circuit 36 in the repertory circuit 32 to inputs of the gate circuit 24 which has outputs connected by lines 38*a*, 38*b*, 38*c* and 38*d* to inputs of a memory 40 in a number signal generator 41, enclosed by dashed lines. A function control circuit 42, having inputs on lines 44, 46 and 48 from a pulse and power circuit 50, has outputs connected by line 52 to the gate circuit 24, by line 54 to the automatic read circuit 36 and an automatic control circuit 58, and by line 56 to the automatic control circuit 58. The number signal generator 41 in response to signals or representations of digits on lines 38*a*, 38*b*, 38*c* and 38*d* is capable of producing a telephone number signal on telephone lines, identified TIP, GRD and RING, connected to a telephone system (not shown). The function control circuit 42 has (a) a manual mode for enabling the gate circuit 24 to pass signals on lines 22*a*, 22*b*, 22*c* and 22*d* to the respective lines 38*a*, 38*b*, 38*c* and 38*d*, (b) a record or program mode for enabling the repertory circuit 32 to store, at addresses selected by the push button encoder, representations of telephone numbers from lines 22*a*, 22*b*, 22*c*, and 22*d*, and (c) a call mode for enabling the repertory circuit 32 to apply representations of digits of a telephone number to lines 34*a*, 34*b*, 34*c* and 34*d* and hence to lines 38*a*, 38*b*, 38*c* and 38*d* in response to selection of an address by the push button encoder 20.

In the number generator circuit 41, the memory 40 is a read-write or random access memory having four parallel binary data inputs, four parallel binary outputs, address or select inputs, a memory enable input and a write enable input. Integrated circuit memories, such as model number MCM 4064 sold by Motorola, Inc. and model no. Ser. No. 7489 sold by Texas Instruments, Inc. are suitable.

The line 44 from the pulse and power circuit 50 is connected to a clear circuit 62 which has outputs connected by a line 64 to a read-write address circuit 66 and an output control circuit 68, and by a line 70 to a counter circuit 72 for initially clearing the number generator circuit 41.

Lines 74*a*, 74*b*, 74*c* and 74*d* connect outputs of the read-write address circuit to the address inputs of the memory 40. The lines 38*a*, 38*b*, 38*c* and 38*d* are connected to inputs of a bounce elimination circuit 76 which has an output connected by line 78 to one input of a NOR gate 80 connected by line 84 to the memory enable input of the memory 40. The line 78 is also connected by a strobe pulse generator 86 to a line 88 connected to the write enable input of the memory 40. Additionally, the line 78 is connected by an inverter 87 and a line 89 to inputs of the read-write address circuit 66 and the output control circuit 68.

Inverted outputs of the memory 40 are connected by lines 90*a*, 90*b*, 90*c* and 90*d* to a gate circuit 92. A line 94 from the output control circuit 94 is connected to an input of a strobe pulse generator 96 which has its output connected by line 98 to the gate circuit 92. The outputs of the gate circuit 92 are connected by lines 100*a*, 100*b*, 100*c* and 100*d* to inputs of a counter circuit 72 which has outputs connected by lines 102*a*, 102*b*, 102*c* and 102*d* to the output control circuit 68. The output control circuit 68 has an output connected by line 104 to an input of the read-write address circuit 66 and the NOR gate 80 and has an input connected to a line 107 from an output of the read-write address circuit 66. Another output of the output control circuit 68 is connected by a line 108 to an oscillator circuit 110 which in turn has its output connected by line 112 to inputs of the pulse and power circuit 50 and the counted circuit 72. The pulse and power circuit 50 is connected to the telephone lines TIP, GRD and RING.

In the telephone number repertory circuit 32, a line 114 from the function control circuit 42 is connected to an input of a clear circuit 116 which has outputs connected by line 118 to a memory address circuit 120, the address gate circuit 26, the automatic read circuit 36, and the automatic control circuit 58, and by line 122 to the memory address circuit 120 and the parallel-to-serial converter circuit 30 for initially clearing the repertory circuit 32. A line 123 from the bounce elimination circuit 28 is connected to inputs of the address gate circuit 26 and the automatic control circuit 58. A line 125 from the automatic read circuit 36 is connected to input of the automatic control circuit 58.

The parallel-to-serial converter 30 is a suitable circuit for converting parallel binary signals applied to parallel inputs thereof to serial binary signals on a serial output of the parallel-to-serial converter 30. The line 122 is connected to a clear input of the parallel-to-serial converter 30. Additionally, the converter 30 has a preset input and a clock input. A suitable parallel-to-serial converter is model No. S 5494, four-bit shift register sold by Signetics Corporation.

The automatic control circuit 58 has outputs connected by lines 124 and 128 to the automatic read circuit 36, by lines 129 and 131 to the preset input and the clock input respectively of the parallel-to-serial converter 30, and by lines 134 and 136 to the memory address circuit 120. Inputs of the circuit 58 are connected to line 126 from the automatic read circuit 36 and to lines 130 and 132 from the address gate circuit 26. Outputs of the address gate circuit 26 are connected by lines 132, 138*a*, 138*b*, 138*c* and 138*d* to the memory address circuit 120. A line 144 from an output of the automatic control cicuit 58 and a line 146 from the serial data output of the parallel-to-serial converter 30 are connected to respective inputs of a NOR gate 148 which has its output connected by line 152 to a serial data input of a memory 150.

The memory 150 is a 1,024 bit static random access memory, such as model number 2602 from Signetics Corporation, having binary storage locations which are randomly accessed by the signals on the address inputs of the memory. The memory also has a read-write control input, a serial data output and a grounded chip select input. A power supply 151 is connected to the memory 150 for suitably supplying power to the memory 150.

Lines, collectively indicated by 154, connect outputs of the memory address circuit to the address inputs of the memory 150. Line 153 connects an output of the automatic control circuit 58 to the read-write input of the memory 150. The data output of the memory 150 is connected by line 156 to an input of the automatic read circuit 36.

As shown in FIG. 2, the push button encoder 20 contains a keyboard or keypad with ten normally open push button switches 158*a* through 158*j* which are connected between ground and various inputs of NAND gates 160*a*, 160*b*, 160*c* and 160*d* in a binary encoding arrangement. The inputs of the NAND gates 160*a*, 160*b*, 160*c* and 160*d* are normally biased through resistors 162*a* (only one shown) through 162*j*. Each of the push button switches 158*a* through 158*j* corresponds to one of the telephone digits, 1,2,3,4,5,6,7,8,9,0 which are selected to form telephone numbers. The encoding network, connecting the switches 158*a* through 158*j* to the inputs of the NAND gates 160*a*, 160*b*, 160*c* and 160*d*, is formed to produce binary coded signals on output lines 22*a*, 22*b*, 22*c* and 22*d* connected to outputs of the NAND gates 160*a*, 160*b*, 160*c* and 160*d*, which signals are the two's complement of the selected digit, assuming that the digit 0 corresponds to decimal 10.

The gate circuit 24, shown in FIG. 3, has NAND gates 168*a*, 168*b*, 168*c* and 168*d* with first inputs connected to the respective lines 22*a*, 22*b*, 22*c* and 22*d* and second inputs connected to the line 52. The outputs of the gates 168*a*, 168*b*, 168*c* and 168*d* are connected to respective inputs of NAND gates 170*a*, 170*b*, 170*c* and 170*d* which have second inputs from the respective lines 34*a*, 34*b*, 34*c* and 34*d*. The second inputs of the NAND gates 170*a*, 170*b*, 170*c* and 170*d* are biased through resistors 172*a*, 172*b*, 172*c* and 172*d* connected to the voltage terminal 164. The outputs of the NAND gates 170*a*, 170*b*, 170*c* and 170*d* are connected to the respective lines 38*a*, 38*b*, 38*c* and 38*d*.

Figures 4, 5, 6, 9:
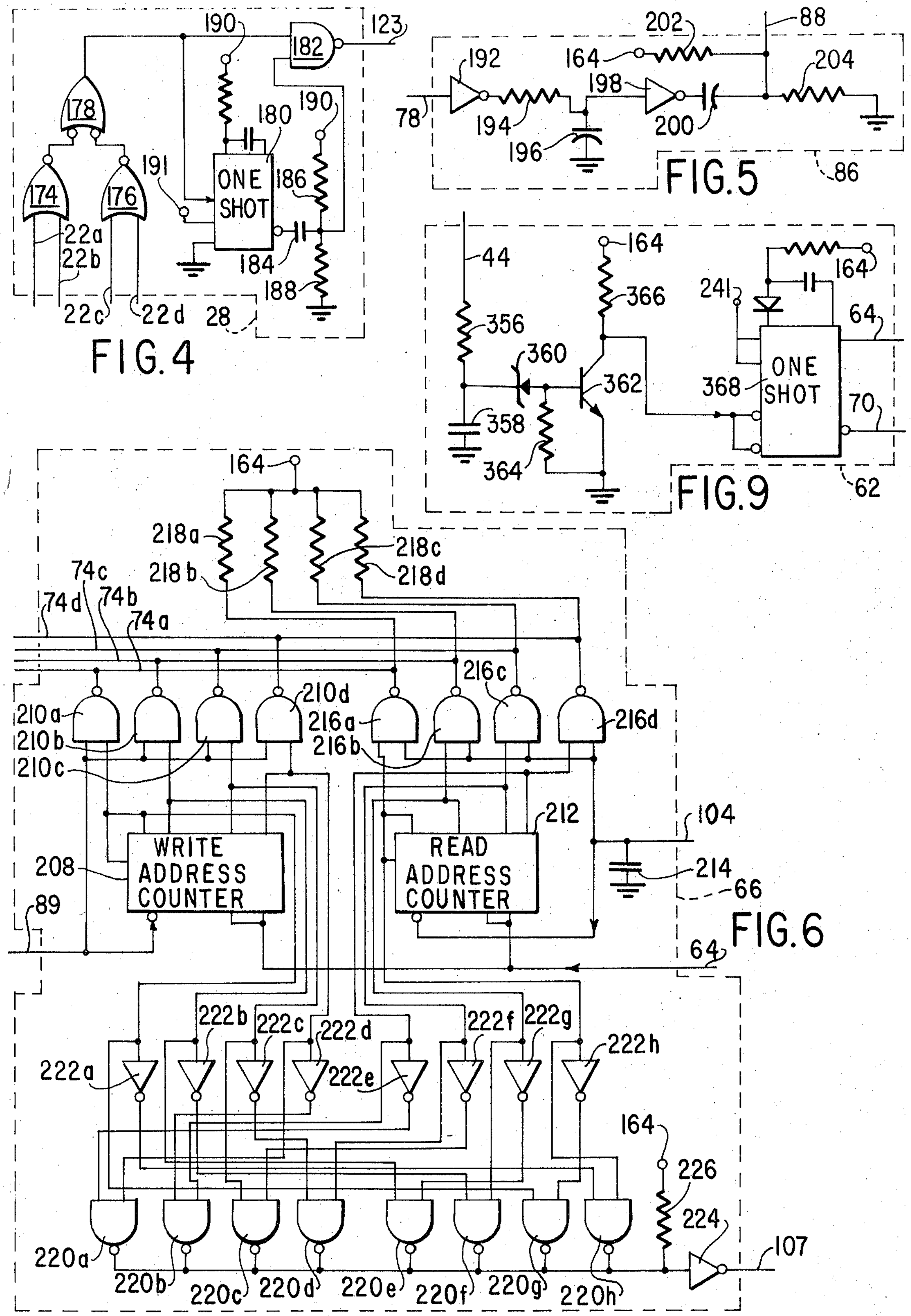
FIG. 4 is a detail diagram of a bounce elimination circuit of the circuitry shown in FIG. 1.
FIG. 5 is a detail diagram of a strobe pulse generator of the circuitry shown in FIG. 1.
FIG. 6 is a detail diagram of a read-write address circuit of the circuitry shown in FIG. 1.
FIG. 9 is a detail diagram of a clear circuit included in the circuitry shown in FIG. 1.

The bounce elimination circuit 28, illustrated in FIG. 4, has a NOR gate 174 with a first input connected to the line 22*a* and a second input connected to the line 22*b*. A second NOR gate 176 has a first input connected to line 22*c* and a second input connected to line 22*d*. The outputs of the NOR gates 174 and 176 are connected to respective inputs of a NAND function gate 178 which has its output connected to an input of a one shot 180 and an input of a NAND gate 182. The output of the one shot 180 is connected to a differentiating circuit including a series capacitor 184 connected to the junction of two serially connected resistors 186 and 188 connected between a voltage terminal 190 and ground. The junction of the resistors 186 and 188 is connected to the second input of the NAND gate 182, which has an output connected to line 123. Various capacitors, resistors and biasing terminals, such as terminal 191, are shown connected to an integrated circuit unit to form the one shot 180 in a conventional manner; such manner of connecting capacitors, resistors and biasing terminals being well known in the art and described in the various manuals to produce a one shot circuit with a suitable output signal for a suitable duration. The duration of output signal from the one shot 180 is selected to exceed the duration that the push button switches 158*a* through 158*j*, FIG. 2, produce irregularities due to contact bounce and the like in operation of the push button switches, and is selected to be substantially less than the least normal operation time of one of the push button swithces 158*a* through 158*j*.

The bounce elimination circuit 76 of FIG. 1 is substantially the same as the bounce elimination circuit 28 except that the inputs are from lines 38*a*, 38*b*, 38*c* and 38*d* and the output is line 78.

The strobe pulse circuit 86 is shown in detail in FIG. 5 and includes an inverter 192 connected to the line 78. The output of the inverter 192 is connected in series with a resistor 194 which is joined to one side of a capacitor 196 which has its other side connected to ground to form an integration type delay circuit. The junction of the resistor 194 and the capacitor 196 is connected to the input of an inverter 198 whose output is connected in series with a capacitor 200 connected to the junction of resistors 202 and 204 connected between the voltage terminal 164 and ground to form a differentiating circuit. The strobe pulse generator 86 is designed to produce a delayed short duration pulse or signal on the line 88 connected to the junction of the resistors 202 and 204 for allowing the various circuits to stabilize prior to writing in the memory 40.

The strobe pulse generator 96, FIG. 1, is substantially similar to the strobe pulse generator 86 except that the inputs of the strobe pulse generator 96 are from line 94 and the output is on line 98.

As shown in FIG. 6, the read-write address circuit 66 includes a write address counter 208 having an advance input connected to the line 89 such as to be advanced upon the trailing edge of a signal on line 89. Outputs of the write address counter 208 are connected to first inputs of NAND gates 210*a*, 210*b*, 210*c* and 210*d*. Second inputs of the NAND gates 210*a*, 210*b*, 210*c* and 210*d* are connected to the line 89 while the outputs of the NAND gates 210*a*, 210*b*, 210*c* and 210*d* are connected to the respective lines 74*a*, 74*b*, 74*c* and 74*d*. An advance input of a read address counter 212 is connected to the line 104 across a noise eliminating and delay capacitor 214. The counter 212 has outputs connected to the respective first inputs of NAND gates 216*a*, 216*b*, 216*c* and 216*d* while second inputs of the NAND gates 216*a*, 216*b*, 216*c* and 216*d* are connected to the line 104. The outputs of the NAND gates 216*a*, 216*b*, 216*c* and 216*d* are connected to the respective lines 74*a*, 74*b*, 74*c* and 74*d* which are biased through resistors 218*a*, 218*b*, 218*c* and 218*d* coupled to the voltage terminal 164. Reset inputs of the write address counter 208 and the read address counter 212 are connected to the line 64.

The outputs of the write address counter 208 are connected to first inputs of respective NAND gates 220*a*, 220*c*, 200*e* and 220*g*, while the outputs of the read address counter 212 are connected to first inputs of respective NAND gates 220*b*, 220*d*, 220*f* and 220*h*. Inverters 222*a*, 222*b*, 222*c* and 222*d* couple the outputs of the write address counter 208 to second inputs of respective NAND gates 220*b*, 220*d*, 220*f* and 220*h* while inverters 222*e*, 222*f*, 222*g*, and 222*h* couple the respective outputs of the read address counter 212 to second inputs of respective NAND gates 220*a*, 220*c*, 220*e* and 220*g*. The outputs of the NAND gates 220*a* through 220*h* are coupled to an input of an inverter 224 which is biased through a resistor 226 connected to the voltage terminal 164. The read-write address circuit 66 is designed to produce a signal on line 107 if the address on the outputs of the write address counter 208 is the same as the address on the outputs of the read address counter 212.

Figure 7:
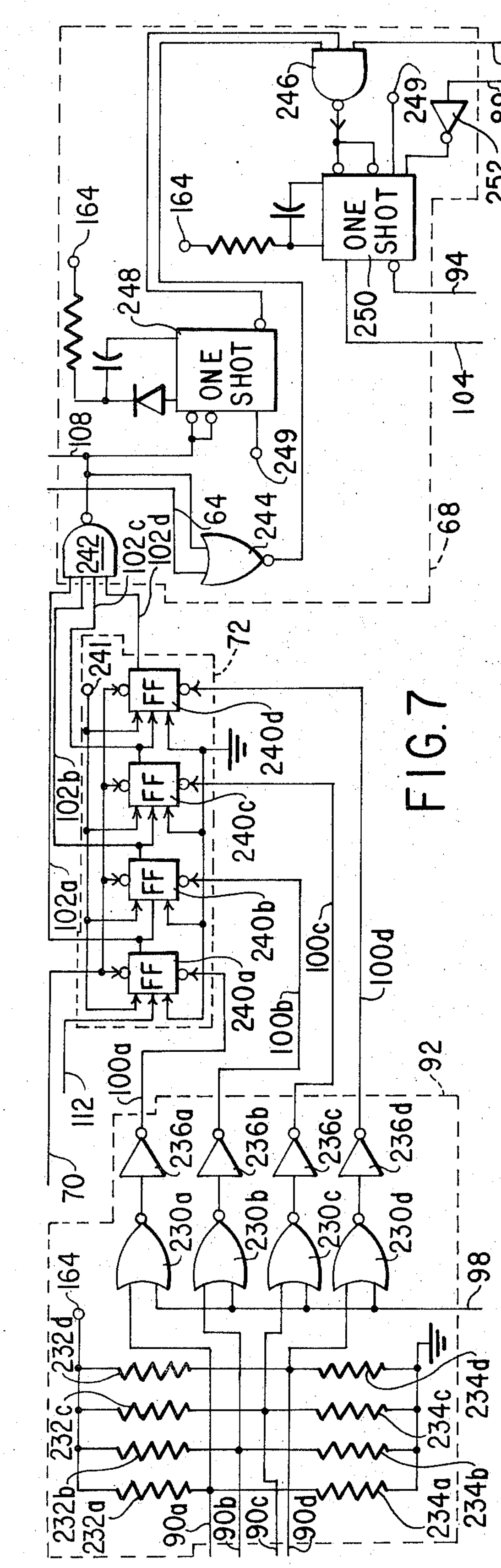
FIG. 7 is a detail diagram of a memory gating circuit, a counter circuit, and a control circuit, of the circuitry shown in FIG. 1.

As shown in FIG. 7, the gate circuit 92 includes NOR gates 230*a*, 230*b*, 230*c* and 230*d*, which have first inputs connected to the lines 90*a*, 90*b*, 90*c* and 90*d*. Pairs of resistors 232*a* and 234*a*, 232*b* and 234*b*, 232*c* and 234*c*, and 232*d* and 234*d* connected serially between the voltage terminal 164 and ground have junctions connected to the respective lines 90*a*, 90*b*, 90*c* and 90*d* for biasing the lines. Second inputs of the NOR gates 230*a*, 230*b*, 230*c* and 230*d* are connected to the line 98. The outputs of the NOR gates 230*a*, 230*b*, 230*c* and 230*d* are connected by inverters 236*a*, 236*b*, 236*c* and 236*d* and the lines 100*a*, 100*b*, 100*c* and 100*d* to reset inputs of flip-flops 240*a*, 240*b*, 240*c* and 240*d* interconnected to form the binary counter 72. J and K inputs of the flip-flops 240*a*, 240*b*, 240*c* and 240*d* are connected to a biasing terminal 241 and ground in a conventional manner. The line 112 is connected to an input of the flip-flop 240*a* while the output of the flip-flop 240*a* is connected to an input of the flip-flop 240*b*, an output of the flip-flop 240*b* is connected to the input of the flip-flop 240*c*, and an output of flip-flop 240*c* is connected to an input of the flip-flop 240*d*, such that the counter 72 counts down with each pulse on line 112. Set or preset inputs of the flip-flops 240*a*, 240*b*, 240*c* and 240*d* are connected to the line 70.

The outputs of the flip-flops 240*a*, 240*b*, 240*c* and 240*d* are connected by the respective lines 102*a*, 102*b*, 102*c* and 102*d* to inputs of a NAND gate 242 in the output control circuit 68. The output of the NAND gate 242 is connected by the line 108 to the first input of a NOR gate 244 while a second input of the NOR gate 244 is connected to the line 64. The output of the NOR gate 244 is connected to a first input of a NAND gate 246. Also the line 108 is connected to inputs of a one shot circuit 248 which has its output connected to a second input of the NAND gate 246. A third input of a NAND gate 246 is connected to the line 107. Inputs of a one shot 250 are connected to the output of the NAND gate 246 and to the output of an inverter 252 coupled to the line 89. The one shot 248 is designed to produce a pulse output which has a duration corresponding to the desired duration between successive pulse trains in signalling a telephone number. The NAND gate 246 enables the operation of the one shot 250 in the absence of an output signal from the one shot 248, the presence of signals on all of the lines 102*a*, 102*b*, 102*c* and 102*d* and the absence of a coincidence signal on line 107. Outputs of the one shot 250 are connected to the respective lines 94 and 104.

The oscillator 110 is shown as including an integrated circuit unit 254 to which is connected resistors and a capacitor as well as the voltage terminal 164 and ground to produce an oscillator capable of generating pulses having a frequency and duty cycle suitable for pulsing a telephone number on a telephone line. The line 108 is connected to an enable input of the oscillator unit 254 while the line 112 is connected to the output of the oscillator unit 254.

In the pulse and power circuit 50 the line 112 is connected by resistor 276 to the base of a grounded emitter transistor 278, which base is biased by a resistor 280 connected to ground. The collector of the transistor 278 is connected to one terminal of a relay coil 282 which has its other end connected to the voltage terminal 164. The coil 282 is part of a relay indicated generally at 284 which has normally closed dial pulsing contacts 286 connected to terminals 288 and 290 and a telephone circuit 292. Normally open contacts 294 of the relay 284 are connected to terminals 296 and 298 which are connected in parallel with the receiver in the telephone circuit 292 across the terminal 290 and normally closed contacts 308 of a hook switch 309 in series with terminal 310 and the RING conductor of the telephone lines. A series combination of a resistor 301 and a relay coil 302 of a relay, indicated generally at 303, and a diode 304 across the resistor 301 and coil 302 are connected in series with the terminal 288, dial pulsing contacts 286, terminal 290, the telephone receiver and normally closed contacts 308 across terminals 307 and 310 connected to respective conductors TIP and RING of the telephone lines. Contacts 313 of the relay 303 are connected between the line 44 and the series circuit of normally closed contact 315 and a contact arm 316 of the hook switch 309 to a positive terminal of a battery 317 to supply voltage to the line 44. The resistor 301 and the relay coil 302 have impedence values which are sufficiently small not to interfere with audio signals to the receiver. The diode 304 has a polarity across the resistor 301 and the coil 302 such that the diode 304 shunts the resistor 301 and coil 302 during the dialing period until the called party answers and the polarity of the voltage on terminals 307 and 310 reverses.

The battery 317, when the receiver is replaced operating the hook switch 309, is connected through the contact arm 316, a normally open contact 318 and line 48 for providing a charging current to the battery 317. A diode 320, connected to ground and the negative terminal of the battery 317, is connected to the RING conductor of the telephone lines to complete the charging path for the battery 317 when the telephone is not being operated. A zener diode 321 is connected across the battery 317 to protect the battery against voltage surges. Line 46 is connected to terminal 307 and the TIP conductor.

In the function control circuit 42, a contact arm 324 of a manual or automatic mode control switch, indicated generally at 326, is connected to the line 44. The switch 326 is a manual switch which can be operated to connect the contact arm 324 either to a contact 328 or a contact 330. Contact 328 is connected to line 52 and across a resistor 332 to ground. Also the line 44 is connected to the voltage terminal 164 and by a resistor 333 to the bias terminal 241 to form the source of power for the terminals 164 and 241. The contact 330 is connected to the line 114, the voltage terminal 190, contact arm 334 of a program switch indicated generally at 336, and by a resistor 337 to the bias terminal 191. Contacts 338 and 340 of the switch 336 can be alternately engaged by the contact arm 334. The switch 336 also includes a contact arm 342 connected to the line 48, and contact 344 connected by resistor 346 to the line 46. The resistor 346 is selected to limit the charging current through line 48 to less than that which would indicate to a telephone system that a receiver is lifted. A contact 348 selectively engaged by the contact arm 342 is also connected to the contact 330. The switch 336 is such that the contact arm 334 engages the contact 338 and the contact arm 342 engages the contact 344 with the switch 336 in a call or dial position, and the contact arm 334 engages the contact 340 and the contact arm 342 engages the contact 348 when the switch 336 is in a program or record position. The contact 338 is connected to the line 54 and across resistor 350 to ground while the contact 340 is connected to the line 56 across a resistor 352 to ground.

The clear circuit 62, illustrated in FIG. 9, includes a resistor 356 connected between the line 44 and a capacitor 358 to ground. The junction of the resistor 356 and the capacitor 358 is connected by a zener diode 360 to the base of a grounded emitter transistor 362 which has its base biased through a resistor 364 to ground. The collector of the transistor is connected by a resistor 366 to the voltage terminal 164 and to inputs of a one shot 368. The outputs of the one shot 368 are connected to the respective lines 64 and 70 for producing opposite polarity clearing pulses on the lines 64 and 70 when voltage is initially applied to the line 44.

The clear circuit 116 is substantially similar to the clear circuit 62 except that the input is on line 114 and the outputs are on lines 122 and 118.

Figures 10, 12:
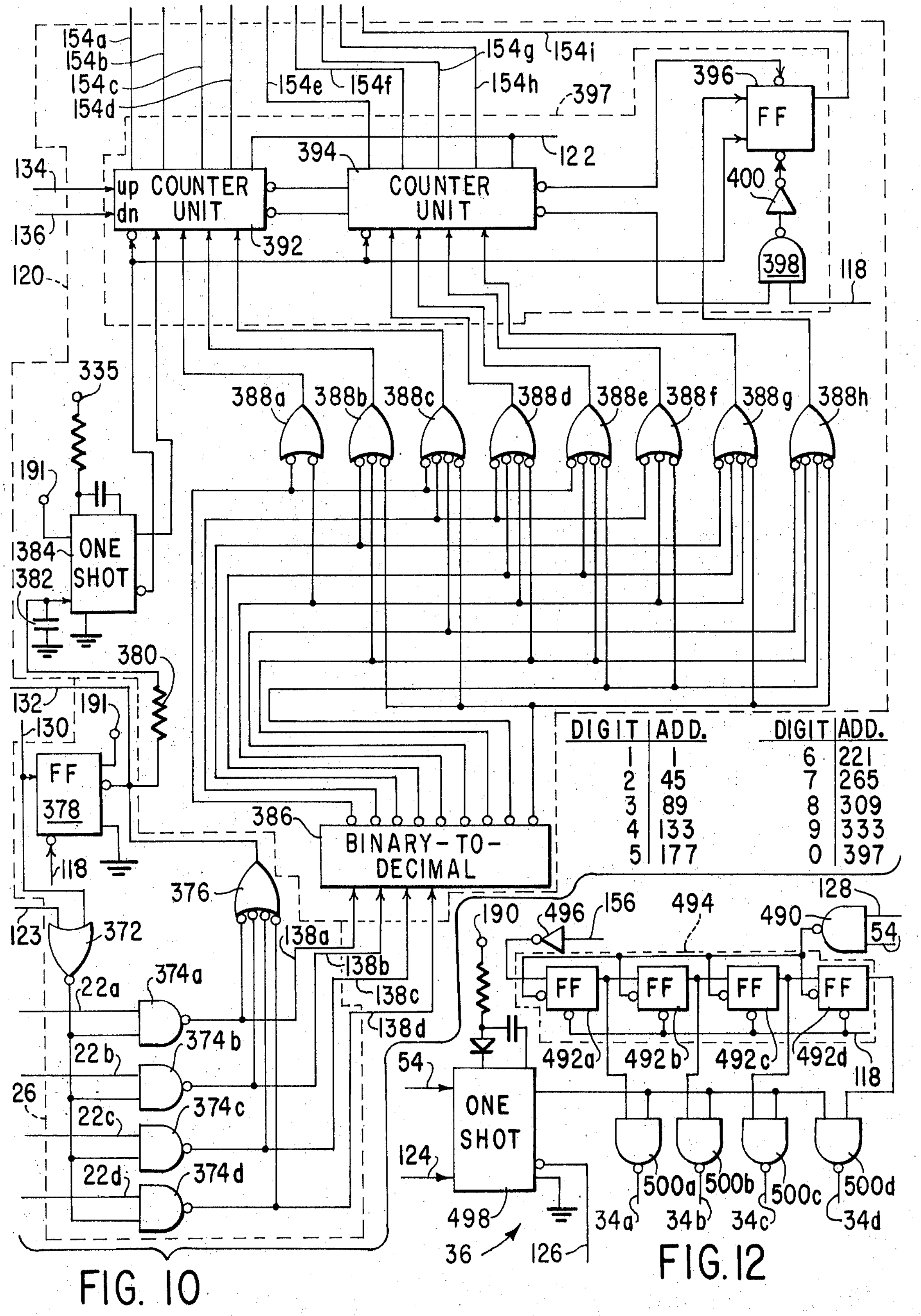
FIG. 10 is a detail diagram of an address gate circuit and a memory address circuit of the circuitry of FIG. 1.
FIG. 12 is a detail diagram of an automatic read circuit in the circuitry of FIG. 1.

The address gate circuit 26 is shown in FIG. 10 and includes a NOR gate 372 having a first input connected to the line 123 and its output connected to first inputs of NAND gates 374*a*, 374*b*, 374*c* and 374*d*. Second inputs of the NAND gates 374*a*, 374*b*, 374*c* and 374*d* are connected to the respective lines 22*a*, 22*b*, 22*c* and 22*d*. Inputs of a NAND-function gate 376 are connected to outputs from the respective NAND gates 374*a*, 374*b*, 374*c* and 374*d*. The output of the gate 376 is connected to the clock input of a flip-flop 378 which has its output connected to the line 130 for producing an output signal at the trailing edge of the first digit applied to lines 22*a*, 22*b*, 22*c* and 22*d* to disable the NOR gate 372 and prevent further signals from passing through NAND gates 374*a*, 374*b*, 374*c* and 374*d* until a clear signal is applied over line 118 connected to a clear input of the flip-flop 378.

In the memory addressing circuit, the line 132 is connected by an integrating type delay circuit, including a series resistor 380 and a capacitor 382 shunted to ground, to an input of a one shot 384. A binary-to-decimal decoder, such as model No. S 5442 from Signetics Corporation, has inputs connected to the lines 138*a*, 138*b*, 138*c* and 138*d*. Outputs of the decoder 386, corresponding to the decimal numbers 2 through 10, are connected to various inputs of NAND-function gates 388*a*, 388*b*, 388*c*, 388*d*, 388*e*, 388*f*, 388*g* and 388*h* in a coding arrangement designed to produce binary outputs on the gates 338*a* through 388*h* for each of the signals on the outputs of the decoder 386 separated by 44 binary counts. Four-stage up-down binary counters 392 and 394, such as type SN 54193 from Texas Instruments, Inc., and a flip-flop 396 are connected in a binary counting arrangement to form a nine-stage binary counter 397 which is adequate to count the 440 addresses required to store binary coded representations of ten telephone numbers of eleven digits each. The negative going output of one shot 384 is connected to the load inputs of the counters 392 and 396 and the clock input of the flip-flop 396. The positive-going output of the one shot 384 is connected to the first data input of the counter 392 while the outputs of the gates 388*a* through 388*g* are connected to remaining data inputs of the counters 392 and 394, and the output of the gate 388*h* is connected to the data input of the flip-flop 396. Up and down inputs of the counter 392 are connected to the respective lines 134 and 136 while carry-and-borrow outputs of the counter 392 are connected to the respective up and down inputs of the counter 394. The carry output of the counter 394 is connected to the preset input of the flip-flop 396 while the borrow output of the counter 394 is connected through a NAND gate 398 and an inverter 400 to the clear input of the flip-flop 396. Outputs of the counters 392 and 394, and the output of the flip-flop 396 are connected to the lines 154*a*, 154*b*, 154*c*, 154*d*, 154*e*, 154*f*, 154*g*, 154*h* and 154*i* (collectively referred to in FIG. 1 as lines 154) to apply memory address signals thereon. Clear inputs of the counters 392 and 394 are connected to the line 122 while the line 118 is connected to a second input of the NAND gate 398 to clear any address stored in the counters 392 and 394 and the flip-flop 396.

Figure 11:
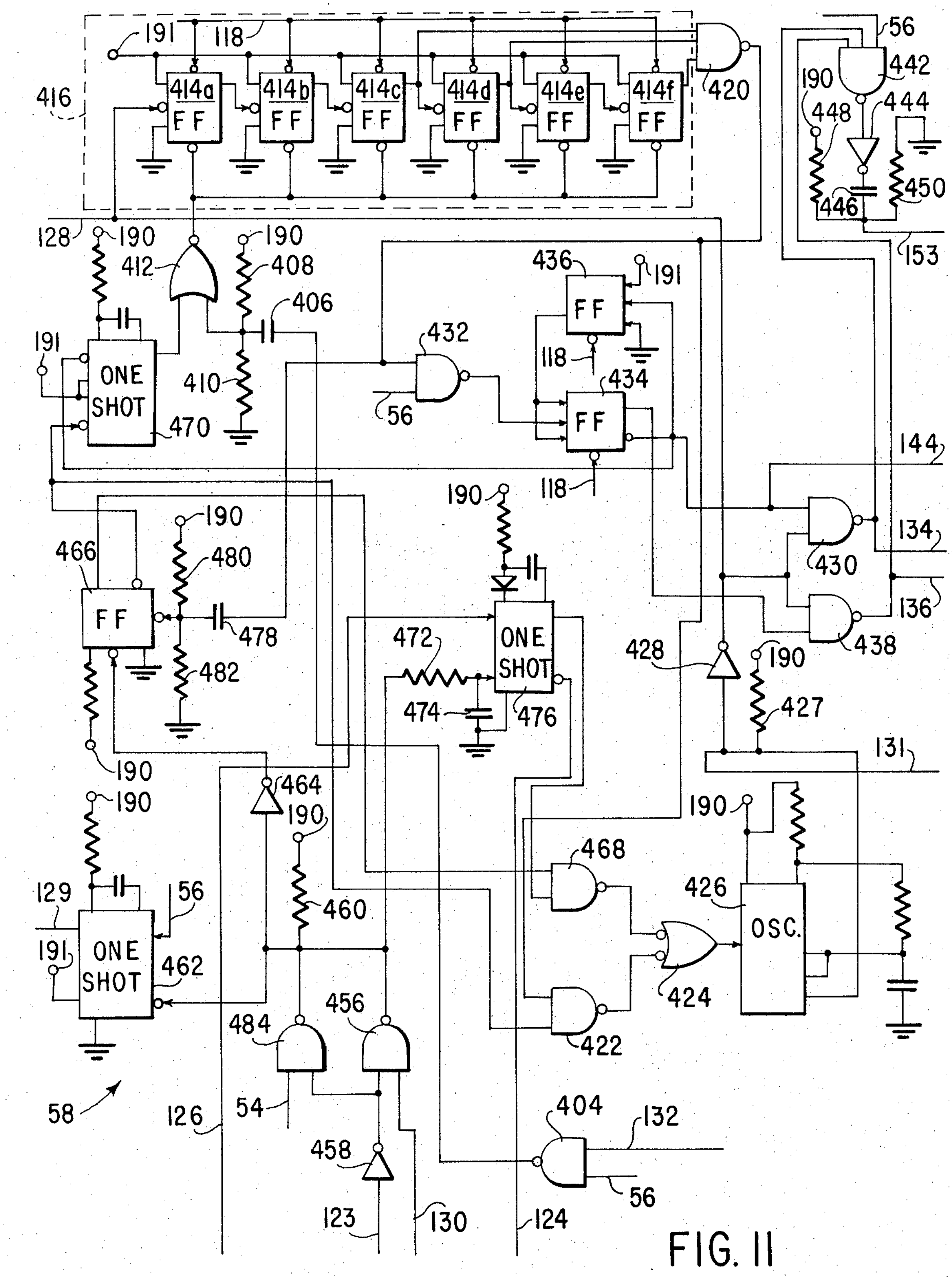
FIG. 11 is a detail diagram of an automatic control circuit of the circuitry of FIG. 1.

The automatic control circuit 58 shown in FIG. 11 has a NAND gate 404 with one input connected to the line 56 and a second input connected to the line 132. The output of the NAND gate 404 is connected through a differentiating circuit including a series capacitor 406 connected to the junction of resistors 408 and 410 connected serially between the voltage terminal 190 and ground. The junction of the resistors 408 and 410 is connected to one input of a NOR gate 412 which has its output connected to clear inputs of flip-flops 414*a*, 414*b*, 414*c*, 414*d*, 414*e* and 414*f* interconnected in a binary counting arrangement to form a 64 bit counter 416. The outputs of flip-flops 414*c*, 414*d* and 414*f* are connected to inputs of a NAND gate 420 to render the output of the NAND gate 420 low whenever the count in the counter 416 reaches 44.

The output of the NAND gate 420 is connected to a first input of a NAND gate 422 which has its output connected to an input of a NAND-function gate 424 connected to a controlling input of an oscillator 426. The oscillator 426 is an integrated circuit with components such as resistors and capacitors for producing a series of pulses at a high rate relative to the dialing pulses and push-button operation. The output of the oscillator 426, biased by a resistor 427 to the voltage terminal 190, is connected by an inverter 428 to an input of the first flip-flop 414*a* in the counter 416 to advance the counter 416. Also the inverter 428 is connected to the first input of a NAND gate 430 whose output is connected by the line 134 to up input of the counter 392 (FIG. 10). A NAND gate 432 has a first input connected to the output of the NAND gate 420, a second input connected to line 56, and an output connected to the clock input of a flip-flop 434 interconnected with a flip-flop 436 in a binary counting arrangement. The $\bar{Q}$ output of the flip-flop 434 is connected to the clock input of the flip-flop 436, a second input of the NAND gate 430 and to the line 144. The Q output of the flip-flop 434 is connected to the first input of a NAND gate 438 which has its second input connected to the output of the inverter 428.

The Q output of the flip-flop 436 is connected to the J-K inputs of the flip-flop 434 to disable the flip-flop 434 when it returns to its initial state. The output of the NAND gate 438 is connected by the line 136 to the down input of the counter 392 (FIG. 10). Lines 134, 136 and 56 are connected to inputs of a NAND gate 442 which has its output connected by an inverter 444 to a differentiating circuit including a capacitor 446 to the junction of a pair of resistors 448 and 450 connected across the voltage terminal 190 and ground. The junction of the resistors 448 and 450 is connected to the line 153. Line 118 is connected to clear inputs of the flip-flops 434 and 436 and to preset or set inputs of the flip-flops 414*a* through 414*f*.

Line 130 is connected to a first input of a NAND gate 456 while the line 123 is connected by an inverter 458 to a second input of the NAND gate 456. The output of the NAND gate 456 biased by a resistor 460 to the voltage terminal 190 is connected to an input of a one shot 462 which has an enable input connected to line 56. The output of the one shot 462 is connected to the line 129. Also the output of the NAND gate 456 is connected by an inverter 464 to a clock input of a flip-flop 466. The negative-going output of the flip-flop 466 is connected to the second input of the NAND gate 422 while the positive-going output of the flip-flop 466 is connected to the first input of a NAND gate 468 which has its output connected to a second input of the NAND-function gate 424. Also the negative-going output of the flip-flop 466 is connected to an input of a one shot 470 which has its output connected to a second input of the NOR gate 412. The $\bar{Q}$ output of the flip-flop 434 is connected to a second input of the one shot 470.

The output of the NAND gate 456 is connected through an integration type delay circuit, including a series resistor 472 connected to a capacitor 474 shunted to ground, to an input of a one shot 476 which has one output connected to a second input of NAND gate 468. The one shot 476 is selected to produce a pulse duration equal to the time of four pulses from the oscillator 426. The output of the NAND gate 420 is connected to a differentiating circuit including a serial capacitor 478 connected to the junction of a pair of resistors 480 and 482 in series between the voltage terminal 190 and ground. The junction of the resistors 480 and 482 is connected to the clear input of the flip-flop 466.

The line 54 is connected to a first input of a NAND gate 484 while the second input of the NAND gate 484 is connected to the output of the inverter 458 from the line 123. Another output of the one shot 475 is connected to the line 124 and the line 126 is connected to a second input of the one shot 476. Also the output of the inverter 428 is connected to the line 128, while the output of the oscillator 426 is connected to line 131.

The automatic read circuit 36, as shown in FIG. 12, has a NAND gate 490 with a first input connected to the line 54 and a second input connected to the line 128. The output of the NAND gate 490 is connected to clock inputs of flip-flops 492*a*, 492*b*, 492*c* and 492*d* interconnected as a shift register 494. The line 156 is connected by an inverter 496 to the first stage 492*a* of the shift register 494. The line 54 is connected to an enable input of a one shot 498 which has a trigger input connected to the line 124. A first output of the one shot 498 is connected to first inputs of NAND gates 500*a*, 500*b*, 500*c*, and 500*d* while second inputs of the NAND gates 500*a*, 500*b*, 500*c* and 500*d* are connected to respective outputs of the flip-flops 492*a*, 492*b*, 492*c* and 492*d* in the shift register 494. The outputs of the NAND gates 500*a*, 500*b*, 500 *c* and 500*d* are connected to the lines 34*a*, 34*b*, 34*c* and 34*d*. A second output of the one shot 498 is connected to the line 126.

Operation

Figure 8:
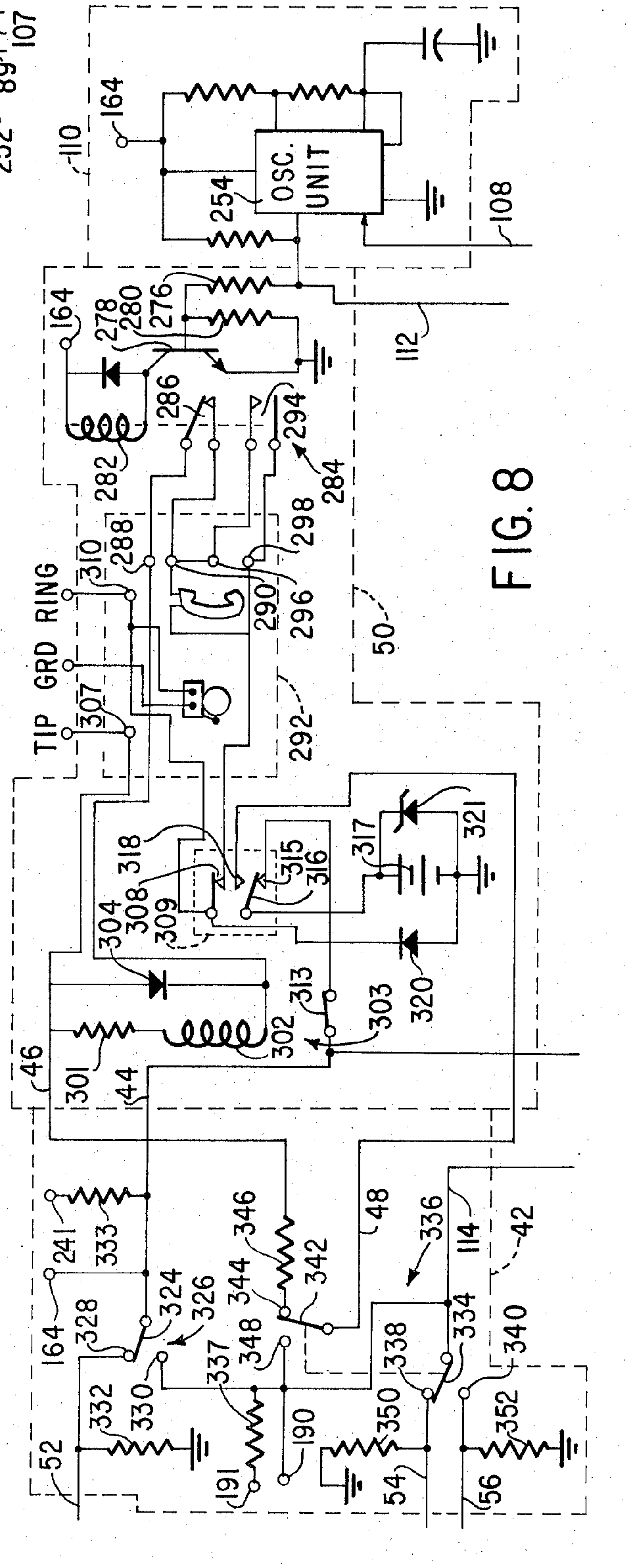
FIG. 8 is a detail diagram of a function control circuit, a pulse and power circuit, and an oscillator circuit of the circuitry shown in FIG. 1.

In operation of the telephone number generator, shown in FIG. 1, an operator by the function control circuit 42, shown in FIG. 8, selects the mode of operation of the dialing apparatus. Through the switch 326 the operator selects either a manual mode or an automatic mode, and by the switch 336 the operator selects either a dialing mode or a program mode when the switch 326 is in the automatic mode. When the switch 326 is in the manual mode, the operator by operating the push botton switches 158*a* through 158*j*, FIG. 2, in accordance with a selected telephone number causes the number signal generator 41 to generate corresponding number signals on the telephone lines. When the switch 326 is in the automatic mode and the switch 336 is in the program mode, the operator by depressing a first selected one of the switches 158a through 158*j* selects a particular one of ten storage spaces in the telephone number repertory circuit 32 into which the operator wishes to store a selected telephone number; subsequently, the operator by depressing the switches 158*a* through 158*j* in accordance with the selected telephone number programs or stores the selected telephone number into the selected storage location. When the switch 326 is in the automatic mode and the switch 336 is in the dial mode, the operator by first depressing a selected one of the switches 158*a* through 158*j* selects a pre-programed number which is to be automatically dialed; the operation of the selected button causing the telephone number repertory circuit 32 to operate the number signal generator 41 to generate corresponding number signals on the telephone lines.

In the number signal generator, the lifting of a handheld receiver of the telephone from the hook switch 309 applies a power signal to the line 44 which operates the clear circuit 62, applying clear signals to lines 64 and 70 clearing the counter 72, the read-write address circuit 66 and the output control circuit 68.

The application of a binary coded signal to lines 38*a*, 38*b*, 38*c* and 38*d* is sensed by the bounce elimination circuit 76 to produce a signal on line 78 which is applied by the NOR gate 80 to the memory enable input of the memory 40. Also, the signal on line 78 operates a strobe pulse generator circuit 86 to apply a write signal to the write enable input of the memory 40 to record or store a representation of the binary coded signal on lines 38*a*, 38*b*, 38*c* and 38*d* in the first memory location selected by a write address signal produced on lines 74*a*, 74*b*, 74*c* and 74*d* and a signal on line 89 from inverter 87 applied to the read-write address circuit 66. Upon the trailing edge of the signal from the inverter 87 on line 89, a write address portion 89 of the read-write address circuit 66 is advanced to the next write address in the memory 40 in preparation for storing the next number applied to the lines 38*a*, 38*b*, 38*c* and 38*d*. Also at the end of the signal on line 89 the output control circuit 68 produces a read signal on line 104 which is applied by the NOR gate 80 to the memory enable input of the memory 40 to generate the data signals stored in the first memory location on the outputs of the memory and apply them to lines 90*a*, 90*b*, 90*c* and 90*d*. Also, a read signal is generated on line 94 which causes the strobe pulse generator circuit 96 to apply a strobe pulse over line 98 to the gate circuit 92 gating the data from lines 90*a*, 90*b*, 90*c* and 90*d* over lines 100*a*, 100*b*, 100*c* and 100*d* to inputs of the counter circuit 72. The outputs of the counter circuit 72 apply signals to lines 102*a*, 102*b*, 102*c* and 102*d* which are sensed by the output control 68 to be a non-predetermined count to generate a signal on line 108 which initiates operation of the pulse oscillator circuit 110. The oscillator 110 applies pulses to line 112 which operates the pulse and power circuit 50 to generate trains of pulses on the telephone lines. Also the pulses on line 112 are applied to the counter 72 which changes the count in the counter 72 until the counter 72 reaches the predetermined count to operate the output control circuit 68 and terminate the control signal on line 108 and the operation of the oscillator 110. At the termination of the read signal on line 104, a read portion in the read-write address circuit 66 is advanced to the next memory location to be read. In the event the next read address is the same as the last write address, the read-write address circuit 66 produces an output signal on line 107 which prevents the output control circuit 68 from producing read signals on lines 104 and 94.

When the function control circuit 42 is in either the automatic program mode or the automatic call mode, the gate circuit 24 is disabled through line 52 to prevent signals on lines 22*a*, 22*b*, 22*c* and 22*d* from passing to lines 38*a*, 38*b*, 38*c* and 38*d*. When the function control circuit 42 is placed in the automatic program or automatic call mode, the function control circuit 42 produces a signal on line 114 which operates the clear circuit 116. Clear signals from the clear circuit 116 on lines 118 and 122 reset the automatic control circuit 58, the memory address circuit 120, the address gate circuit 26, the parallel-to-serial converter 30, and the automatic read circuit 36. The first operation of the push button encoder circuit 20 applies a corresponding binary signal over lines 22*a*, 22*b*, 22*c* and 22*d* to the inputs of the address gate circuit 26 and the bounce elimination circuit 28. A pulse signal on line 123 from bounce elimination circuit 28 operates the address gate circuit 26 applying the binary signal on lines 22*a*, 22*b*, 22*c* and 22*d* over lines 138*a*, 138*b*, 138*c* and 138*d* to the memory address circuit 120. The address gate circuit 26 is set by the trailing edge of the first binary signals applied to lines 138*a*, 138*b*, 138*c* and 138*d* for preventing passage of subsequent signals from lines 22*a*, 22*b*, 22*c* and 22*d* to lines 138*a*, 138*b*, 138*c* and 138*d*. Also, the setting of the address gate circuit 26 produces a signal on line 130 enabling the automatic control circuit 58 to control subsequent steps. The memory address circuit 120 applies address signals over lines 154 to address inputs of the memory 150 to select a memory location.

When the line 56 has a signal thereon from the selection of the automatic program mode by the function control 42, a signal on line 132 causes the automatic control circuit 58 to step the memory address circuit up through clock signals on line 134 and then down through clock signals on line 136 while erase signals are applied over line 144 through gate 148 and line 152 to the data input of the memory 150. Simultaneous to the erase signals, write signals are applied over line 153 to the read-write input of the memory 150 to clear a memory block to receive a corresponding telephone number.

The subsequent binary coded decimal signals on lines 22*a*, 22*b*, 22*c* and 22*d* selected by the push-botton encoder 20 in accordance with the desired telephone number to be stored in the memory 150 are applied to inputs of the parallel-to-serial converter 30. The automatic control circuit 58 in response to the bounce elimination circuit 28 applying a signal on line 123 produces a preset signal on line 120 temporarily storing the binary coded decimal digit in the parallel-to-serial converter 30. Thereafter, clock signals are applied to lines 131, 134 and 153 by the automatic control circuit 58 to write the four digits from serial output of the parallel-to-serial converter 30 through line 146, the NOR gate 148 and line 152 into the memory 150 as address circuit 120 is stepped in synchronism to select four serial memory addresses in the memory 150. After the four digits in the parallel-to-serial converter 30 have been written in the memory 150, the automatic control circuit 58 terminates the generation of pulses on lines 131, 134 and 153, thus preparing the circuit for the next digit to be selected by the push-button encoder 20.

When the line 54 has a signal thereon as a result of the selection of the automatic call mode by the function control circuit 42, the signal on line 130 at the end of the first binary signals applied to lines 22*a*, 22*b*, 22*c* and 22*d* causes the automatic control circuit 58 to apply four clock signals over lines 134 to step the memory address circuit 120 to cause the meory 150 to apply four serial binary digits corresponding to a digit of a telephone number over line 156 to an input of the automatic read circuit 36. Clock signals over line 128 from the automatic control circuit stores the binary number on line 156 in the automatic read circuit 36. Then a signal on line 124 operates the automatic read circuit 36 to apply the binary coded number in parallel form from the automatic read circuit 36 to lines 34*a*, 34*b*, 34*c* and 34*d*, and hence through gate circuit 24 to lines 38*a*, 38*b*, 38*c* and 38*d* causing the number signal generator 41 to apply telephone number signals to the telephone lines. After applying the parallel binary coded signals to lines 34*a*, 34*b*, 34*c* and 34*d*, the automatic read circuit 36 applies a signal over line 126 to the automatic control circuit 58 to initiate another cycle of reading the next serial binary coded number from the memory 150 into the automatic read circuit 36. The repertory circuit 32 will thus continue to read out serial binary numbers from the memory 150 and apply parallel binary numbers to the number signal generator 41 until the memory address circuit 120 has been stepped through 44 addresses; thus, a telephone number containing eleven telephone digits stored in the memory 150 can be read out and applied by the number signal generator 41 to the telephone lines in response to the selection of a single push button in the push-button encoder 20.

Referring to FIG. 2, the depressing of one of the switches 158*a* through 158*j* connects selected ones of inputs of NAND gates 160*a*, 160*b*, 160*c* and 160*d* to ground to produce corresponding high-level outputs and signals on lines 22*a*, 22*b*, 22*c* and 22*d*. The dial number gate 24 of FIG. 3 gates the signals on lines 22*a*, 22*b*, 22*c* and 22*d* through NAND gates 168*a*, 168*b*, 168*c* and 168*d* if a manual mode selection signal is present on line 52. The outputs of the NAND gates 168*a*, 168*b*, 168*c* and 168*d* are passed through the NAND gates 170*a*, 170*b*, 170*c* and 170*d* to lines 38*a*, 38*b*, 38*c* and 38*d* and hence to the data inputs of the memory 40 in FIG. 1. If the line 52 is biased low, NAND gates 168*a*, 168*b*, 168*c* and 168*d* are disabled to prevent the signals on the lines 22*a*, 22*b*, 22*c* and 22*d* from being applied to the inputs of the memory 40.

When signals are initially applied to the bounce elimination circuit 28, shown in FIG. 4, signals through the NOR gates 174 and 176 produce an output on the NAND-function gate 178 which triggers the one-shot 180 for a predetermined duration. At the trailing edge of the output of the one-shot 180 a positive going pulse produced by the differentiator circuit is applied to the input of the NAND gate 182 which has its other input connected to the output of the NAND-function gate 178. Thus, the NAND gate 182 produces a suitable short duration pulse indicating the initiation and presence of a signal on lines 22*a*, 22*b*, 22*c* and 22*d* after the period in which the switches 158*a* through 158*j* tend to bounce or produce irregular signals. Additionally, the pulse output of NAND gate 182 continues only for a duration which is substantially less than the normal duration of the closure of the switches 158*a* through 158*j* to avoid irregularities in the operation of the telephone number generator occurring upon the opening of a selected switch. The bounce elimination circuits 28 and 76 of FIG. 1 avoid the erroneous recording of data in the memories 40 and 150 due to irregularities in signals from push-button switches.

Referring to FIG. 5, the strobe pulse generator 86 produces a delayed pulse signal resulting from a delay in the charging of capacitor 196 to operate the inverter 198 which then generates a short pulse output through the differentiator circuit. Thus, the strobe pulse output from the strobe pulse generator 86 is delayed by an amount determined by the resistor 194 and the capacitor 196 and has a short duration determined by the capacitor 200 and the resistors 202 and 204.

Referring to FIG. 6, the write address counter 208 and the read address counter 212 are reset to their zero counts by the clear signal on line 64. A write signal on line 89 operates the NAND gates 210*a*, 210*b*, 210*c* and 210*d* to apply the output of the write address counter to the lines 74*a*, 74*b*, 74*c* and 74*d*. At the trailing edge of the write signal on line 89, the write address counter 208 is advanced to the next address or count. Similarly, the read signal on line 104 operates gates 216*a*, 216*b*, 216*c* and 216*d* to apply the output of the read address counter 212 to the lines 74*a*, 74*b*, 74*c* and 74*d*. The trailing edge of the read signal on line 104 advances the read address counter 212 to the next address or count. When the outputs of the write address counter 208 and the output of read address counter 212 are the same, the outputs of NAND gates 220*a* through 220*h* will all be high producing a coincidence signal on line 107 to prevent further operation of the number signal generator 41 (FIG. 1) until another number has been written in memory 40. The non-coincidence of a signal on an output from the write address counter 208 with the respective output of the read address counter 212 causes one of the NAND gates 220*a* through 220*h* to produce a low output thus producing a high output on line 107 indicating the non-coincidence of the write address counter 202 with the read address counter 212.

Referring to FIG. 7, the presence of a high input on all of the inputs of the NAND gate 246 as well as the absence of a write signal on line 89 to the inverter 252 and the enable input of the one-shot 250 allows the one-shot 250 to trigger producing read signals on lines 104 and 94. The delayed strobe pulse on line 98 resulting from the read signal on line 94 is applied to the inputs of the NOR gates 230*a*, 230*b*, 230*c* and 230*d*, thus passing the output of the memory 40 on lines 90*a*, 90*b*, 90*c* and 90*d* through inverters 236*a*, 236*b*, 236*c* and 236*d* to the reset inputs of the flip-flops 240*a*, 240*b*, 240*c* and 240*d* of the counter 72. The outputs of the flip-flops 240*a*, 240*b*, 240*c* and 240*d* are changed from their full count to a lower count which is the inverse of the two's complement of the selected telephone digit to produce a high output from NAND gate 242 over line 108. Oscillator pulses are applied through line 112 to the input of the flip-flop 240*a* to reduce the count in the counter 72. Once the counter in the counter 72 reaches the full count, the NAND gate 242 again produces a low output terminating the production of telephone pulses. Upon the output of the NAND gate 242 going negative, the NOR gate 244 produces a positive output enabling the NAND gate 246. Simultaneously, the low output on line 108 triggers the one-shot 248 producing a low output which disables the NAND gate 246 for a duration corresponding to the selected duration between successive trains of telephone pulses. After the operation of the one-shot 248, the NAND gate 246 is operated in the event that the line 107 is high indicating that the additional numbers have been read into the memory 40.

Referring now to FIG. 8, the output of the oscillator on line 112 operates the transistor 278 which pulses the relay coil 282 causing the dialing pulses contact 286 to open and close a circuit between the terminals 288 and 290 in series with the telephone lines TIP and RING to dial a telephone number. With each operation of the coil 282, the contacts 294 close, thus shorting out the terminals 296 and 298 across the hand-held telephone receiver preventing undue noise in the operator's ear.

When the hand-held receiver is on the hook switch, the switch 309 is operated disconnecting the contact arm 316 from the contact 315 and engaging the contact 318 to complete a circuit from the TIP conductor through terminal 307, line 46, resistor 346, contact 344, contact arm 342, line 48, contact 318 and contact arm 316 to the positive terminal of the battery 317. A charging circuit for the battery 317 is completed through negative terminal of the battery 317 through the diode 320 and terminal 310 to the RING conductor. When the hook switch 309 is allowed to return to its normal position by lifting the hand-held receiver, the contacts 308 close thus completing the dialing circuit from the TIP conductor through the diode 304, terminal 288, dial pulse contacts 286, terminal 290, the receiver and contacts 308 back to the RING conductor. Also, when the hook switch 309 returns to its normal position, the contact arm 316 disengages the contact 318 thus opening the charging circuit to the battery 317 and connecting the battery 317 through the contact arm 316, contact 315 and contacts 313 to the line 44 and the voltage terminal 164. When the voltage between the TIP conductor and the RING conductor reverses upon the called party answering his telephone, the diode 304 becomes non-conductive and current is passed through the resistor 301 and the relay 302 thus opening the contacts 313 to conserve the power of the battery 317 to prevent discharge during the time that the telephone is being used in normal conversation.

In the function control circuit 42, shown in FIG. 8, the manual mode is selected by the switch 326 having its contact arm 324 engaging the contact 328 to apply a voltage from line 44 to line 52. When the switch 326 is in a position identified as automatic mode, the contact arm 324 engages the contact 330 applying voltage to contact arm 334 and contact 348 of the switch 336 to enable the switch 336 to select a call mode. In the record mode, the contact arm 342 engages the contact 348 and the contact arm 334 engages the contact 340 to supply voltage from the line 48 and battery 317 through contact arm 342, contact 348, contact arm 334 and contact 340 to line 56. For the record mode the hook switch 309 is in its operated position, i.e., the hand-held receiver in place to connect the contact arm 316 with the contact 318. In the call mode the hook switch 309 has its contact arm 316 engaging contact 315, i.e., receiver raised, and the contact arm 334 engages the contact 338 supplying voltage from the battery 317 through contact arm 316, contact 315, contacts 313, contact arm 324, contact 330 contact arm 334 and contact 340 to the line 56.

The clear circuit 62, shown in FIG. 9, is triggered by the application of the voltage to the terminal 164 and the line 44 by the initial operation of the hook switch 309 when a hand-held receiver is lifted from the telephone instrument. The signal on line 44 is applied by the resistor 356 to charge the capacitor 358 until the breakdown voltage of the zener diode 360 is reached whereupon the transistor 362 becomes conductive triggering the one-shot 368. The one-shot 368 produces clear signals on the lines 64 and 70 to clear various circuit portions in the telephone number generator.

When the function circuit 42 is in either the record mode or call mode and the operator selects a telephone number in the repertory circuit 32 by depressing a push-button switch the address gate circuit 26 in FIG. 10 is activated. In particular, the output of the bounce elimination circuit 28 on line 123 is applied through NOR gate 372 to gate the binary coded signals on lines 22a, 22b, 22c and 22d through the NAND gates 374*a*, 374*b*, 374*c* and 374*d* to the lines 138*a*, 138*b*, 138*c* and 138*d*. The NAND-function gate 376 senses the presence of a signal on any of the outputs of the NAND gates 374*a*, 374*b*, 374*c* and 374*d* to produce a signal on line 312 which has a trailing edge to trigger the flip-flop 378. A first output of the flip-flop 378 is applied to the second input of the NOR gate 372 to prevent further signals on line 123 from gating the NAND gates 374*a*, 374*b*, 374*c* and 374*d*; thus only the first digit produced by the push-button switches 158a through 158*j* (FIG. 2), after a reset cycle from the clear circuit 116 (FIG. 1), is allowed to pass through the address gate circuit 26.

In the memory address 120, the signal on line 132 is applied to the delay circuit through the resisor 380 and the capacitor 382 to trigger the one-shot 384. A first output of the one-shot 384 applies a binary one to first input of the counter unit 392. The binary-to-decimal decoder 386 in response to signals on lines 138*a*, 138*b*, 138*c* and 138*d* produces outputs which are encoded by the NAND-function gates 388*a* through 388*h* and applied to the remaining data inputs of the counter unit 392 and the data inputs of the counter unit 394 and flip-flop 396. The second output of the one-shot 384 sets the selected binary address from the first output of the one-shot 384 and NAND-function gates 388*a* through 388h into the counter 397. The table of FIG. 10 illustrates the selected binary addresses corresponding to the selected decimal digits of the push-button encoder 20 (FIG. 1). The address in the counter 397 applied to lines 154*a* through 154*j* is stepped up or advanced by clock pulses on line 134. The initial selected addresses in the counter 397 are separated by 44 binary digits, thus allowing a block of addresses which is sufficient to store elven binary coded decimal digits.

Referring to FIG. 11, the signal on line 132 caused by the first digit selecting a memory location is applied along with the program signal on line 56 to the input of the NAND gate 404 in the automatic control circuit 58. The pulse output of the NAND gate 404 goes low which at its trailing end applies a positive pulse through the differentiating circuit consisting of capacitor 406 and resistors 408 and 410 and the NOR gate 412 to the clear inputs of flip-flops 414*a* through 414*f* in the binary counter 416. When the counter 416 is reset the NAND gate 420 senses a count other than 44 producing a high output which clears the flip-flop 466 as well as applying an enable signal through NAND gate 422 and NAND-function gate 424 to the oscillator 426 which begins producing clock pulses. The pulse output from the oscillator 426 is applied through the NAND gate 430, which is enabled by the first output of flip-flop 434, to the line 134 to up-input of the counter 392 (FIG. 10). Also, the output of the oscillator 426 is applied by inverter 428 to an input of the flip-flop 414*a* which advances the count in the counter 416 until the count in the counter reaches 44 causing the output of the NAND gate 420 to go low which through the NAND gate 432 triggers the flip-flop 434. The NAND gate 432 is enabled by the program signal on line 56. With the flip-flop 434 being triggered, its second output operates the one-shot 470 applying a signal through the NOR gate 412 to clear the flip-flops 414 *a* through 414*f* in the counter 416 thus initiating another full count cycle through the NAND gate 420, NAND gate 422 and the NAND-function gate 424 to the oscillator 426. The flip-flop 434 enables the down NAND gate 438 which applies count-down signals to the line 138 and disables the NAND gate 430 as well as applying an erase signal to line 144. The program signal on line 56 enables the NAND gate 442 which, at the end of a counting signal on either line 134 or line 136, produces an output signal which is differentiated by capacitor 446 and resistors 448 and 450 to generate a short duration write signal on line 153. When the count within the counter 416 again reaches 44, the NAND gate 420 triggers the flip-flop 434 causing the first output of the flip-flop 434 to trigger the flip-flop 436 which has its output disable the JK inputs of the flip-flop 434 preventing further change of the flip-flops 434 and 436 until another clear signal is applied over line 118.

With the signal produced on line 130 at the trailing edge of the first binary coded signal applied to lines 22*a*, 22*b*, 22*c* and 22*d*, the NAND gate 456 is enabled to allow a subsequent pulse on line 123 from a subsequent binary signal applied to lines 22*a*, 22*b*, 22*c* and 22*d* to trigger the one-shot 462 and apply a pulse over line 129 to the preset input of the parallel-to-serial converter 30 (FIG. 1); thus setting the stages of the parallel-to-serial converter 30 in accordance with the binary coded signal on lines 22*a*, 22*b*, 22*c* and 22*d*. Also, the output of the NAND gate 456 triggers the flip-flop 466 whose outputs disable the NAND gate 422 and enable the NAND gate 468. Also, the output of the flip-flop 466 triggers the one-shot 470 which clears the flip-flops 414*a* through 414*f* and the counter 416. The output of the NAND gate 456 through the resistor 472 is caused to be delayed slightly by the charge time of the capacitor 474 to trigger the one-shot 476. A first output of the one-shot 476 operates the NAND gate 468 and the NAND-function gate 424 to the oscillator 426. The four-pulse output of the oscillator 426 is applied through line 131 to the clock input of the parallel-to-serial converter 30 (FIG. 1) which serially reads out the binary coded digits therein and applies them over line 146 to the NOR gate 148 and the data input of the memory 150. Similarly, subsequent pulse signals on line 123 in response to similarly selected binary coded decimal digits on lines 22*a*, 22*b*, 22*c* and 22*d* (FIG. 1) will be read into successive blocks of four locations in the memory 150 until the counter 416 reaches a count of 44 whereupon the NAND gate 420 operates resetting the flip-flop 466 to disable further operation of the oscillator 426. Additional telephone numbers can be read into the repertory circuit 32 by operating the switch 326 (FIG. 8) or temporarily operating the hook switch 309 to cause a clear signal on lines 118 and 122.

When a call signal is applied to line 54, the NAND gate 484 is enabled to pass a signal from line 123 to inverter 464 and the flip-flop 466 enabling gate 468 and disabling gate 422. The operation of the flip-flop 466 also triggers the one-shot 470 clearing the counter 416. Also, the output of the NAND gate 484 triggers the one-shot 476 causing the operation of the oscillator 426 for four pulses which are applied by inverter 428 to line 128. When the one-shot 476 times out, a read signal is produced on line 124. A signal on line 126 again operates the one-shot 476 beginning another cycle of four pulses of the oscillator 426. The operation of the automatic control circuit 58 continues until the count in the counter 416 reaches 44 terminating the operation of the automatic control circuit.

In the automatic read circuit 36 shown in FIG. 12, the serial information read on the line 156 from the memory data output is clocked into the successive stages 492*a*, 492*b*, 492*c* and 492*d* of the shift register 494 by the clock pulses on line 128 through NAND gate 490 which is enabled by the call signal on line 54. After the serial binary coded decimal signal has been read into the successive stages or flip-flops 492*a*, 492*b*, 492*c*, and 492*d*, the one-shot 498 enabled by the call signal on line 54, is operated by the signal on line 124. The first output of the one-shot 498 operates gates 500*a*, 500*b*, 500*c* and 500*d* to gate the outputs of the registers 492*a*, 492*b*, 492*c* and 492*d* to the lines 34*a*, 34*b*, 34*c* and 34*d*. After operation of the one-shot 498 a signal is applied to the line 126 causing the automatic control circuit 58 to control the read out of a subsequent number from the memory 150 to the line 128.

Since many modifications, variations, and changes in detail may be made to the present embodiment, it is intended that all matter in the foregoing description and shown in the drawings be interpreted as illustrative and not in a limiting sense.

What is claimed is:

1. An apparatus for generating signals corresponding to digits of a selected telephone number on a telephone line comprising a single push-button keyboard including 10 push-button switches, switch means for selecting a record mode or a call mode, memory means for receiving and storing representations of a plurality of telephone numbers in selected locations of the memory means, each of the plurality of telephone numbers having a plurality of digits, means responsive to a first operation of the push-button switches when the switch means is in the record mode or the call mode for selecting a location in the memory means, means responsive to subsequent operation of the push-button switches in accordance with the selected telephone number when the switch means is in the record mode for storing representations of the selected telephone number in the selected location in the memory means, means responsive to the receipt of a representation of a digit for producing signals on the telephone line corresponding to the received representation of the digit, and means responsive to the memory location selecting means when the switch means is in the call mode for applying the representation of digits from the selected location to the signal producing means.

2. An apparatus as claimed in claim 1 wherein said switch means also has a manual mode, and there is included means responsive to the switch means in the manual mode for gating representations of selected digits from the push-button keyboard to the signal producing means.

3. An apparatus as claimed in claim 1 including delay means responsive to the first operation of the push-button switches for preventing operation of the memory location selecting means and storing means until after an initial period during which a push-button switch produces irregularities in an output signal.

4. An apparatus as claimed in claim 2 wherein the signal producing means includes a second memory for receiving and storing representations of digits from the push-button keyboard during the manual mode or from the first memory means during the call mode, a register, means for applying representations of digits from the second memory means to the register to produce a corresponding count in the register, and oscillator means for generating dial pulse signals to form a pulse train having a number of pulses corresponding to the count in the register.

5. An apparatus as claimed in claim 1 wherein the memory location selecting means includes gating means for passing the representation of a first selected digit, and means operated at the termination of the representation of the first selected digit for disabling the gating means to block subsequent representations of selected digits.

6. An apparatus as claimed in claim 5 wherein the disabling means disables the memory storing means and the applying means until the termination of the representation of the first selected digit.

7. An apparatus as claimed in claim 5 wherein the memory location selecting means includes an address counter, and means responsive to a representation of a first selected digit from the keyboard for setting the counter to a selected count corresponding to the first selected digit spaced from the other selected counts by at least the number of digits in the telephone number;

the storing means includes means for sequentially stepping the count in the counter in response to each subsequent operation of the push-button switches; and the applying means includes means for sequentially stepping the count in the counter a predetermined duration after the representation of a digit from a selected address has been applied to the signal producing means.

8. An apparatus as claimed in claim 7 which includes means for counting the number of steps of the address counter preventing reading or writing in an adjacent memory location.

9. An apparatus as claimed in claim 8 which includes means responsive to a first operation of the push-button switches when the switch means is in the record mode for sequentially stepping the address counter up and down through the selected memory location, and means for applying erasing signals to erase any digit stored in the selected memory location during the stepping down of the address counter.

10. An apparatus for applying trains of pulses corresponding to digits of a selected telephone number to a telephone line, comprising a single push-button keyboard including ten push-button switches capable of being selected in accordance with selected digits;

encoding means responsive to operation of the push-button switches for producing parallel binary representations relating to the selected digits;

function control switch means for selecting a manual mode, a record mode or a call mode;

a first random access memory having parallel binary inputs for receiving binary representations, a plurality of storage locations for storing binary representations, and parallel binary outputs;

gating means operated by the function control switch means in the manual mode for applying the binary representations from the encoding means to the first-memory inputs;

write means responsive to parallel binary representations of digits sequentially applied to the first-memory inputs for selecting respective sequential storage locations in the first memory to store the binary representations applied to the first-memory inputs in the respective sequential first-memory storage locations;

read means operable to apply parallel representations of stored binary representations in the respective sequential first-memory storage locations to the first-memory outputs;

a first counter having means for receiving parallel binary representations from the first-memory outputs to produce a corresponding count in the counter;

oscillator means for generating telephone dialing pulses;

means for applying the dialing pulses to the first counter to change the count in the first counter;

control means responsive to the count in the first counter being other than a predetermined count for enabling the oscillator means;

said control means being responsive to the count in the first counter being equal to the predetermined count for disabling the oscillator means and for operating the read means;

a second random access memory having a serial binary input, a plurality of storage locations for storing binary representations and a serial binary output;

a second counter for selecting individual second-memory storage locations;

means responsive to a first operation of the push-button switches when the function control switch means is in the record or call mode for setting the second counter to a selected count which is spaced from other selected counts by at least the number of bits in a telephone number;

means responsive to subsequent operation of the push-button switches when the function control switch means is in the record mode for converting the parallel binary coded decimal representations from the encoding means to serial binary representations;

clock means for sequentially stepping the count in the second counter through four counts;

write means for applying the serial binary representations from the parallel-to-serial converting means to the second-memory serial input in synchronism with the clock means;

means connected between the second-memory serial output and the first-memory parallel inputs for converting serial binary representations to parallel binary representations; and read means responsive to termination of the first operation of the push-button switches when the function control switch means is in the call mode for operating the clock means and the serial-to-parallel converting means in synchronism.

* * * * *